United States Patent
Iwamoto et al.

(10) Patent No.: US 10,707,702 B2
(45) Date of Patent: Jul. 7, 2020

(54) POWER TRANSMISSION APPARATUS (71) Applicant: HONDA MOTOR CO., LTD., Tokyo (JP)

(72) Inventors: Takuya Iwamoto, Saitama (JP);
Tomoaki Nakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 215 days.

(21) Appl. No.: 15/725,575

(22) Filed: Oct. 5, 2017

(65) Prior Publication Data

US 2018/0102676 A1 Apr. 12, 2018

(30) Foreign Application Priority Data

Oct. 11, 2016 (JP) .................................. 2016-200170

(51) Int. Cl.
*H02J 50/40* (2016.01)
*H02J 7/00* (2006.01)
*H02J 7/02* (2016.01)
*H02J 50/12* (2016.01)

(52) U.S. Cl.
CPC ............ *H02J 50/40* (2016.02); *H02J 7/0047* (2013.01); *H02J 7/025* (2013.01); *H02J 50/12* (2016.02)

(58) Field of Classification Search
CPC .......... H02J 50/40; H02J 7/0047; H02J 7/025; H02J 50/12; H02J 50/90; B60L 53/12; H01F 38/14
See application file for complete search history.

(56) References Cited

U.S. PATENT DOCUMENTS

| | | | | |
|---|---|---|---|---|
| 6,738,439 B1 * | 5/2004 | Okanoue | ............... | H04B 7/0814 375/347 |
| 7,636,593 B2 * | 12/2009 | Kurioka | ............... | H04B 7/0814 342/374 |
| 8,452,235 B2 * | 5/2013 | Kirby | ..................... | H02J 7/025 455/41.1 |
| 9,037,197 B2 * | 5/2015 | Ohira | ..................... | H02J 7/025 455/573 |

(Continued)

FOREIGN PATENT DOCUMENTS

| | | |
|---|---|---|
| JP | 2009-089465 A | 4/2009 |
| JP | 2015-100161 A | 5/2015 |

(Continued)

OTHER PUBLICATIONS

Mar. 20, 2018, Japanese Office Action issued for related JP Application No. 2016-200170.

*Primary Examiner* — Pinping Sun
(74) *Attorney, Agent, or Firm* — Paratus Law Group, PLLC (57) ABSTRACT

The power transmission apparatus includes a power transmitting unit which transmits power to a first power receiving unit in a non-contact manner, a housing which accommodates the power transmitting unit, a second power receiving unit which is disposed on a sidewall of the housing and receives the power from the power transmitting unit in a non-contact manner, and an electric load which operates with power that the second power receiving unit has received. The power transmission apparatus operates only with a leakage magnetic flux and operates of a notification such as a non-contact power supply is in progress.

13 Claims, 11 Drawing Sheets

(56) References Cited

U.S. PATENT DOCUMENTS

| | | | | |
|---|---|---|---|---|
| 9,866,278 | B2* | 1/2018 | Lee | H01F 38/14 |
| 2009/0067198 | A1* | 3/2009 | Graham | H02J 7/025 |
| | | | | 363/8 |
| 2010/0201315 | A1 | 8/2010 | Oshimi et al. | |
| 2011/0254376 | A1* | 10/2011 | Sasaki | B60L 5/005 |
| | | | | 307/104 |
| 2012/0223595 | A1* | 9/2012 | Oodachi | H02J 5/005 |
| | | | | 307/104 |
| 2014/0015330 | A1* | 1/2014 | Byun | H02J 5/005 |
| | | | | 307/104 |
| 2015/0098353 | A1* | 4/2015 | Kang | H04W 52/245 |
| | | | | 370/252 |
| 2016/0318408 | A1* | 11/2016 | Tokura | H02J 7/022 |
| 2017/0024997 | A1* | 1/2017 | Venuturumilli | G08B 25/10 |
| 2017/0366034 | A1* | 12/2017 | Matsui | H02J 7/00034 |
| 2017/0373539 | A1* | 12/2017 | Von Novak, III | H02J 50/80 |

FOREIGN PATENT DOCUMENTS

| | | | |
|---|---|---|---|
| JP | 2015-139257 A | 7/2015 | |
| WO | WO 2010/106648 A1 | 9/2010 | |
| WO | WO-2015126103 A1 * | 8/2015 | H02J 17/00 |

* cited by examiner

FIG.11

POWER TRANSMISSION APPARATUS

CROSS REFERENCE TO RELATED APPLICATIONS

This application is based on Japanese Patent Application (No. 2016-200170) filed on Oct. 11, 2016, the contents of which are incorporated herein by reference.

TECHNICAL FIELD

The present invention relates to a power transmission apparatus utilizing a non-contact power transmission technology.

BACKGROUND ART

Patent literature 1 discloses a non-contact power supply system that recovers an electromagnetic field (leakage magnetic flux) that is wasted without being used to supply power during non-contact power supply as the power and makes it possible to effectively use the power. The non-contact power supply system includes: a power supplying coil disposed on a ground side; and a power receiving coil mounted on a movable body and configured to receive power supplied from the power supplying coil in a non-contact manner, wherein a recovery coil is further provided in the vicinity of a space between the power supplying coil and the power receiving coil such that a winding surface thereof intersects leakage magnetic flux occurring when the power is supplied from the power supplying coil to the power receiving coil. A moving mechanism for moving the recovery coil is provided to displace the recovery coil from a state in which the recovery coil lies above or on the ground or is retracted in the ground to a state in which the recovery coil stands up in the vicinity of the space.

RELATED ART LITERATURE

Patent Literature

Patent Literature 1: JP-A-2015-139257

SUMMARY OF THE INVENTION

Problem that the Invention is to Solve

In the non-contact power supply system disclosed in patent literature 1 described above, since the winding surface of the recovery coil is set to intersect the leakage magnetic flux in order to recover the leakage magnetic flux occurring when the power is supplied from the power supplying coil to the power receiving coil, as power, a mechanism such as the moving mechanism is necessary to displace the recovery coil to the state in which the recovery coil stands up in the vicinity of the space. In addition, since relative positions of the power supply coil and the power receiving coil are greatly different each time the non-contact power supply is performed and respective states of the leakage magnetic flux and the useful magnetic flux recovered by the power receiving coil are different depending on the relative position, the recovery coil is not necessarily recover only the leakage magnetic flux even when being displaced to the state of standing up in the vicinity of the space. That is, the recovery coil recovers the useful magnetic flux depending on the relative position, and thus there is a problem that the efficiency in non-contact power supply from the power supplying cod to the power receiving coil is reduced in this case.

An object of the invention is to provide a power transmission apparatus which operates only with a leakage magnetic flux and operates of a notification such as a non-contact power supply is in progress.

Means for Solving the Problem

With a view to achieving the object described above, according to an invention of (1), there is provided a power transmission apparatus including:

a power transmitting unit (for example, a primary coil 101 in an embodiment) which transmits power to a first power receiving unit (for example, a power reception apparatus 10 in an embodiment) in a non-contact manner;

a housing (for example, a housing 103 in an embodiment) which accommodates the power transmitting unit;

a second power receiving unit (for example, a power receiving unit 105 in an embodiment) which is disposed on a sidewall (for example, a sidewall 103a in an embodiment) of the housing and receives power from the power transmitting unit in a non-contact manner; and an electric load (for example, an indicator 107 in an embodiment) which operates with power that the second power receiving unit has received.

According to an invention of (2), in the invention of (1), the second power receiving unit is disposed inside the housing.

According to an invention of (3), in the invention of (1), the sidewall extends in a vertical direction, and the second power receiving unit is disposed such that a winding surface of a coil (for example, a coil 109 in an embodiment) included in the second power receiving unit is along the sidewall.

According to an invention of (4), in the invention of (1), a plurality of the second power receiving units are provided, and the plurality of the second power receiving units are disposed separately from each other.

According to an invention of (5), in the invention of (4), a plurality of the electric loads are provided, the plurality of the electric loads are disposed separately from each other, and the power transmission apparatus includes a power distribution line (for example, a power distribution line 111 in an embodiment) through which power received by at least one of the plurality of the second power receiving units is supplied to the plurality of the electric loads.

According to an invention of (6), in the invention of (4), the power transmission apparatus further includes a switch (for example, a switch 123 in an embodiment) which is provided in each of the plurality of the second power receiving units to open and close a circuit of the second power receiving unit;

a sensor (for example, a sensor 121 in an embodiment) which detects a received power amount in each of the plurality of the second power receiving units; and a controller (for example, a controller 125 in an embodiment) which controls opening and closing of the switch, wherein the controller opens the switch of the second power receiving unit having the smallest received power amount According to an invention of (7), in the invention of (6), the controller closes the switch of the second power receiving unit having the largest received power amount.

According to an invention of (8), in the invention of (4), the power transmission apparatus further includes a controller (for example, a controller 125 in an embodiment) which allows the plurality of the second power receiving units to select power reception or non-reception in a non-contact manner from the power transmitting unit, based on a received power amount in each of the plurality of the second power receiving units.

According to an invention of (9), there is provided a power transmission apparatus including:

a power transmitting unit (for example, a primary coil 201 in an embodiment) which is disposed on a plane and transmits power to a first power receiving unit (for example, a power reception apparatus 10 in an embodiment) in a non-contact manner;

a second power receiving unit (for example, a power receiving unit 205 in an embodiment) which is disposed on the plane and receives power from the power transmitting unit in a non-contact manner; and an electric load (for example, an indicator 207 in an embodiment) which operates with power that the second power receiving unit has received.

According to an invention of (10), in the invention of (9), the second power receiving unit is disposed within a predetermined distance from the power transmitting unit, and the predetermined distance is a distance that the first power receiving unit is located at a position where power transmission efficiency between the power transmission unit and the first power receiving unit is maximized, and the second power receiving unit receives minimum power with which the electric load enables to operate when the power transmission unit transmits predetermined power to the first power receiving unit.

According to an invention of (11), in the invention of (10), the second power receiving unit is disposed at a position apart from the power transmitting unit by the predetermined distance.

According to an invention of (12), in the invention of (11), the second power receiving unit is disposed such that a winding surface of a coil (for example, a coil 209 in an embodiment) included in the second power receiving unit is along the plane.

According to an invention of (13), in the invention of (9), a plurality of the second power receiving units are provided, and the plurality of the second power receiving units are disposed separately from each other.

According to an invention of (14), in the invention of (13), a plurality of the electric loads are provided, the plurality of the electric loads are disposed separately from each other, and the power transmission apparatus includes a power distribution line (for example, a power distribution line 211 in art embodiment) through which power received by at least one of the plurality of the second power receiving units is supplied to the plurality of the electric loads.

According to an invention of (15), in the invention of (13), the power transmission apparatus further includes a switch (for example, a switch 223 in an embodiment) which is provided in each of the plurality of the second power receiving units to open and close a circuit of the second power receiving unit;

a sensor (for example, a sensor 221 in an embodiment) which detects a received power amount in each of the plurality of the second power receiving units; and a controller (for example, a controller 225 in an embodiment) which controls opening and closing of the switch, wherein the controller opens the switch of the second power receiving unit having the smallest received power amount.

According to an invention of (16), in the invention of (15), the controller closes only the switch of the second power receiving unit having the largest received power amount.

According to an invention of (17), in the invention of (13), the power transmission apparatus further includes a controller (for example, a controller 225 in an embodiment) which allows the plurality of the second power receiving units to select power reception or non-reception in a non-contact manner from the power transmitting unit, based on a received power amount in each of the plurality of the second power receiving units.

Advantages of the Invention

According to the invention of (1), the second power receiving unit is disposed on the sidewall of the housing for accommodating the power transmitting unit, and the second power receiving unit receives power from the power transmitting unit only by the leakage magnetic flux. Therefore, the electric load, which operates with the power received by the second power receiving unit, can operate of a notification such as the non-contact power supply is in progress, without affecting the original non-contact power supply from the power transmitting unit to the first power receiving unit.

According to the invention of (2), since the housing accommodates not only the power transmitting unit but also the second power receiving unit, the second power receiving unit can also be protected by the housing.

According to the invention of (3), since the winding surface of the coil stands up in the vertical direction and the second power receiving unit is disposed, it is possible to prevent metal foreign matters or the like from adhering to the coil of the second power receiving unit.

According to the invention of (4) and (13), since the second power receiving units are disposed separately from each other, the electric load operates with the power received by at least one second power receiving unit even if the leakage magnetic flux changing according to the relative position of the power transmitting unit and the first power receiving unit is in any state.

According to the invention of (5) and (14), since the power distribution line is provided, the plurality of electric loads can operate with the power received by at least one of the plurality of second power receiving units.

According to the invention of (6) and (15), since the second power receiving unit having the smallest received power amount can receive the useful magnetic flux from the first power transmitting unit to the first power receiving unit, it is possible to suppress the reduction in efficiency of the original non-contact power supply from the power transmitting unit to the first power receiving unit by opening the switch of the second power receiving unit to be unused.

According to the invention of (7) and (16), since the second power receiving unit having the largest received power amount has a high possibility of receiving the power only by the leakage magnetic flux, it is possible to suppress the reduction in efficiency of the original non-contact power supply due to receiving the useful magnetic flux by another second power receiving unit, by closing only the switch of the second power receiving unit to be used.

According to the invention of (8) and (17), since the second power receiving unit having the small received power amount can receive the useful magnetic flux from the power transmitting unit to the first power receiving unit and the second power receiving unit having the large received power amount has a high possibility of receiving the power only by the leakage magnetic flux, it is possible to suppress the reduction in efficiency of the original non-contact power supply from the power transmitting unit to the first power receiving unit by selecting the power reception or non-reception in the plurality of second power receiving units based on the received power amount.

According to the invention of (9), the second power receiving unit is disposed on the same plane on which the power transmitting unit is disposed, and the second power receiving unit receives the power from the power transmitting unit only by the leakage magnetic flux. Therefore, the electric load, which operates with the power received by the second power receiving unit, can operate of a notification such as the non-contact power supply is in progress, without affecting the original non-contact power supply from the power transmitting unit to the first power receiving unit.

According to the invention of (10) and (11), the second power receiving unit receives minimum power with which the electric load can operate with the leakage magnetic flux when there is no positional misalignment of the first power receiving unit with respect to the power transmitting unit, and the second power receiving unit receives the power with which the electric load can sufficiently operate with the leakage magnetic flux without using the useful magnetic flux when there is the positional misalignment. Therefore, the second power receiving unit can receive the power only by the leakage magnetic flux without using the useful magnetic flux as much as possible.

According to the invention of (12). since the direction of the leakage magnetic flux at the second power receiving unit apart from the power transmitting unit by the predetermined distance is substantially a vertical direction, the winding surface of the coil of the second power receiving unit is disposed along the plane, and thus the second power receiving unit can receive the power with the leakage magnetic flux having good efficiency.

MODE FOR CARRYING OUT THE INVENTION

Hereinafter, embodiments of the invention will be described by reference to the drawings. The drawings should be seen in a direction in which given reference numerals look normal. In the following description, front, rear, left, right, up and down denote, respectively, such directions as seen from a driver of a vehicle who sits in a driver's seat, and front, rear, left, right, up and down sides of the vehicle are denoted by Fry Rr, L, R, U and D, respectively, in the drawings.

First Embodiment

Figure 1:
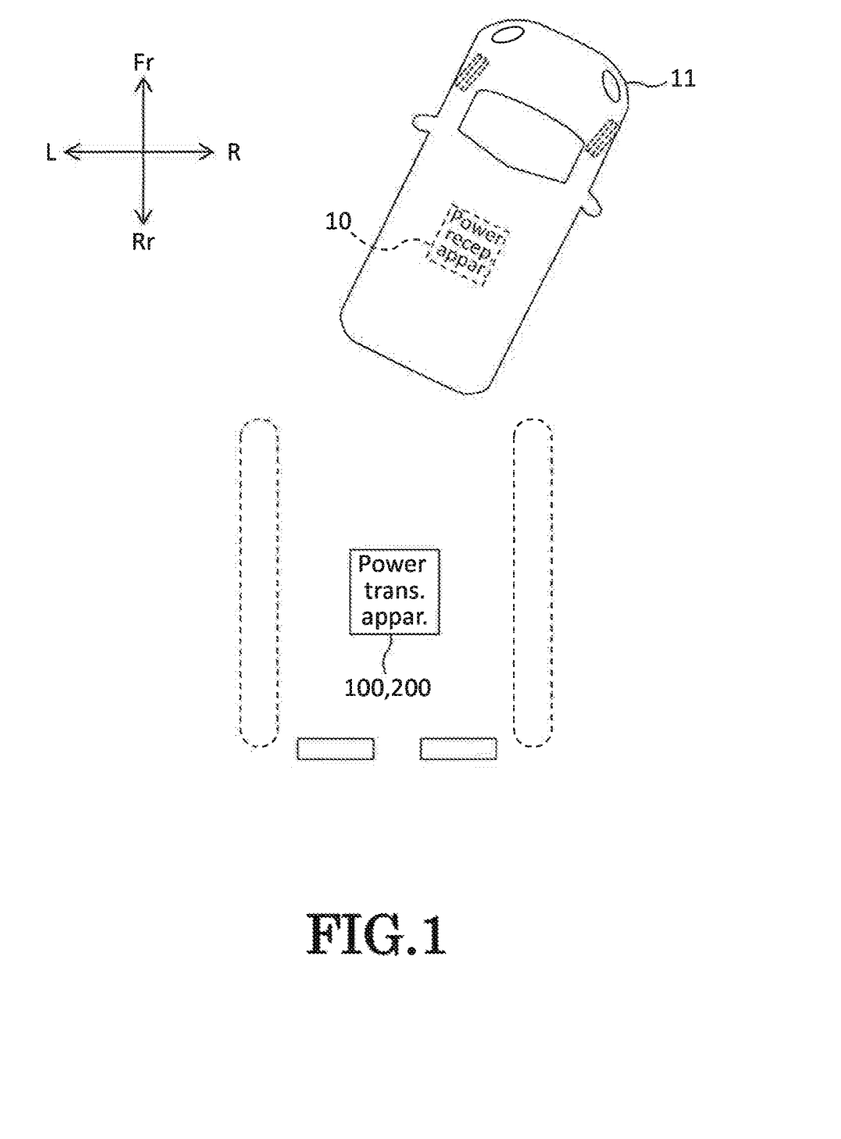
FIG. 1 is a top view illustrating a state in which an electric vehicle is in course of parking at a parking position where a power transmission apparatus is disposed.
Figure 2:
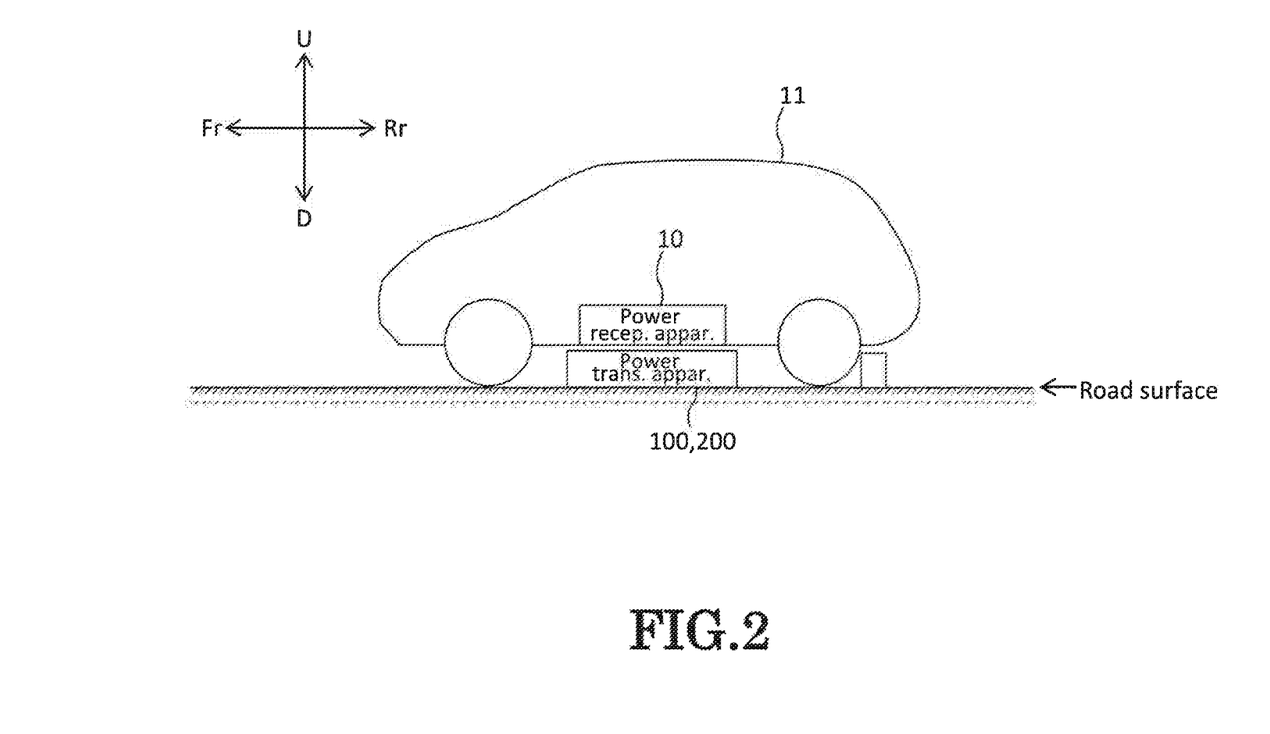
FIG. 2 is a top view illustrating a state in which the electric vehicle is parked at the parking position where the power transmission apparatus is disposed.

FIG. 1 is a top view illustrating a state in which an electric vehicle is in course of parking at a parking position where a power transmission apparatus is disposed. FIG. 2 is a top view illustrating a state in which the electric vehicle is parked at the parking position where the power transmission apparatus is disposed. As illustrated in FIGS. 1 and 2, a power transmission apparatus 100 according to a First embodiment, which is disposed at a parking position of an electric vehicle 11 having a power reception apparatus 10 that receives AC power in a non-contact manner, is disposed on a road surface constituting a parking facility of an electric vehicle 11 and is connected to an external power system such as a Commercial power source. As illustrated in FIG. 1, a driver of the electric vehicle 11 drives the electric vehicle 11 to move forward or backward toward the power transmission apparatus 100, and stops it at a position where the power reception apparatus 10 of the electric vehicle 11 faces the power transmission apparatus 100.

The power transmission apparatus 100 includes a primary coil, and the power reception apparatus 10 of the electric vehicle 11 includes a secondary coil. For this reason, in a state where winding surfaces of the respective coils face each other in proximity to each other, when a current is carried to the primary coil of the power transmission apparatus 100 by AC power obtained from an external power system, the current flows through the secondary coil of the power reception apparatus 10 with magnetic resonance action. Due to this current, a battery of the electric vehicle 11 is charged (through non-contact charging) by way of a rectifier. As a power transmission method from the power transmission apparatus 100 to the power reception apparatus 10, a magnetic resonance method or an electromagnetic induction method may be used.

Figure 3:
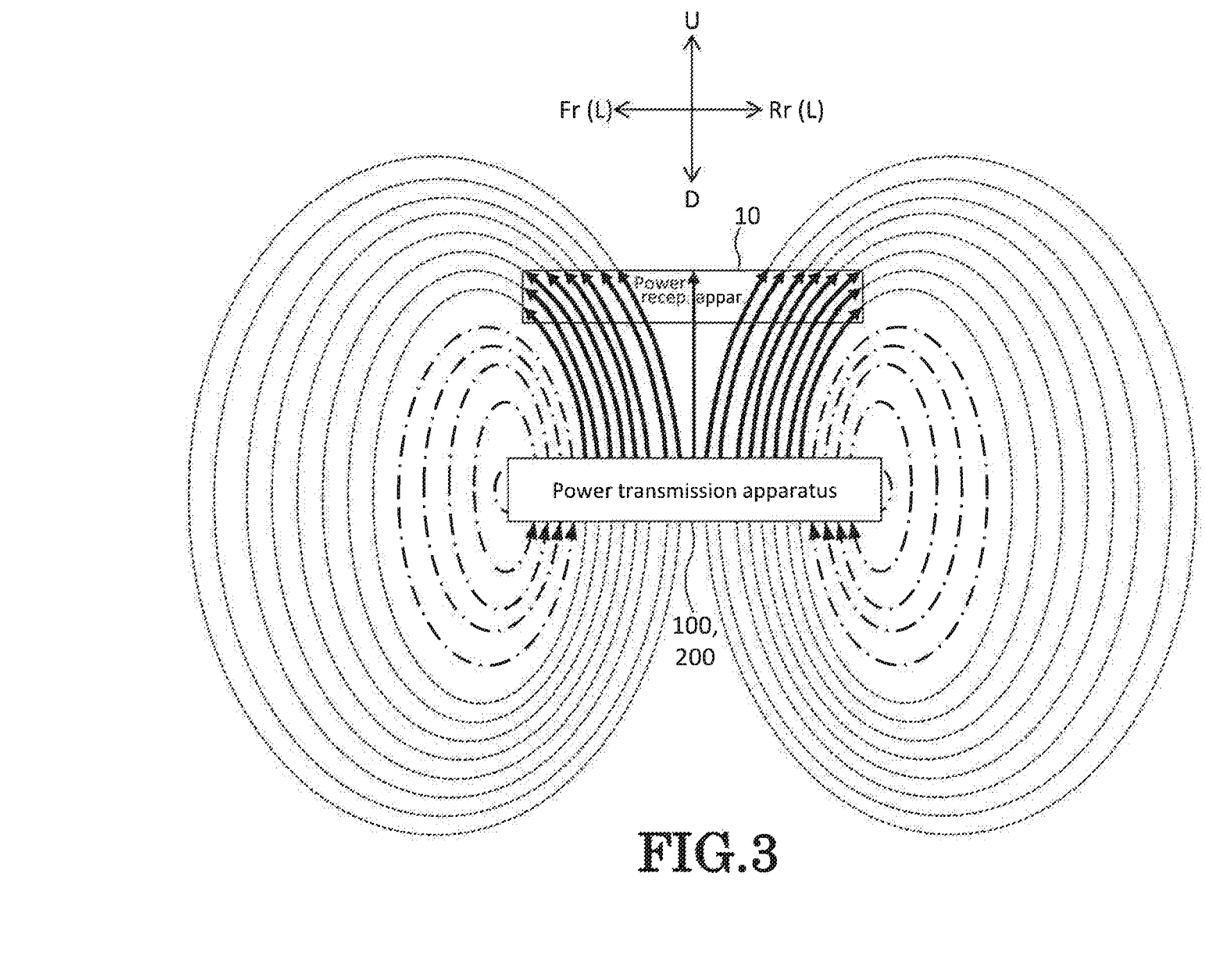
FIG. 3 is a view illustrating condition of a magnetic field generated by the power transmission apparatus in a state in which a power reception apparatus faces the power transmission apparatus in proximity to each other.

FIG. 3 is a view illustrating condition of a magnetic field generated by the power transmission apparatus 100 in a state where the power reception apparatus 10 faces the power transmission apparatus 100 in proximity to each other. In the condition illustrated in FIG. 3, the power reception apparatus 10 is located at a position where power transmission efficiency from the power transmission apparatus 100 to the power reception apparatus 10 is maximized. As illustrated in FIG. 3, in a state where the power reception apparatus 10 faces the power transmission apparatus 100 in proximity to each other, only a part of magnetic flux generated by the power transmission apparatus 100 indicated by a solid arrow in FIG. 3 interlinks with the secondary coil of the power reception apparatus 10 and contributes power transmission from the power transmission apparatus 100 to the power reception apparatus 10. In the following description, the magnetic flux contributing to the power transmission is referred to as "useful magnetic flux", On the other hand, the magnetic flux indicated by an alternate long and short dash line in FIG. 3 which does not interlink with the secondary coil of the power reception apparatus 10 is "leakage magnetic flux" and does not contribute to the power transmission from the power transmission apparatus 100 to the power reception apparatus 10. In the following description, the leakage magnetic flux not contributing to the power transmission is referred to as "useless magnetic flux".

Figure 4:
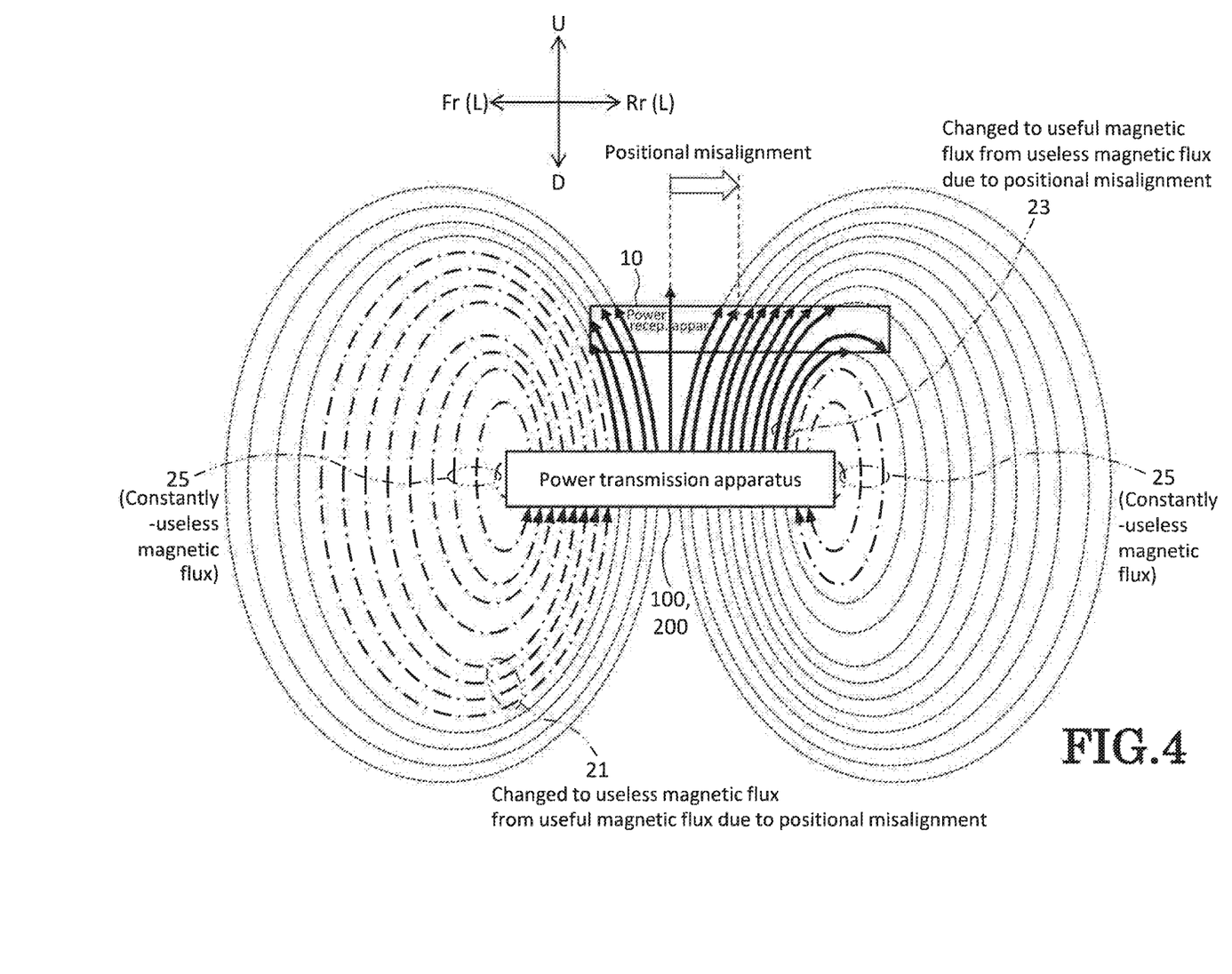
FIG. 4 is a view illustrating condition of a magnetic field generated by the power transmission apparatus in a state in which the power reception apparatus is misaligned in position with the power transmission apparatus in proximity to each other.

In the condition illustrated in FIG. 3, the central magnetic flux of the magnetic flux generated by the power transmission apparatus 100 is the useful magnetic flux, and the side-end magnetic flux thereof is the useless magnetic flux. Assuming the condition illustrated in FIG. 3 as a reference, in a state where the position of the power reception apparatus 10 is misaligned with the power transmission apparatus 100 as illustrated in FIG. 4, a part of the magnetic flux 21 which is the useful magnetic flux in the condition illustrated in FIG. 3 becomes useless magnetic flux, and a part of the magnetic flux 23 which is the useless magnetic flux in the condition illustrated in FIG. 3 becomes useful magnetic flux. As described above, the magnetic flux generated by the power transmission apparatus 100 includes the magnetic flux which is the useful magnetic flux or the useless magnetic flux depending on the positional misalignment of the power reception apparatus 10 with respect to the power transmission apparatus 100, but the side-endmost magnetic flux 25 of the power transmission apparatus 100 is constantly useless magnetic flux irrespective of the degree of the positional misalignment of the power reception apparatus 10. Hereinafter, the magnetic flux, which does not contribute to the power transmission from the power transmission apparatus 100 to the power reception apparatus 10 at all regardless of the relative position of the power transmission apparatus 100 and the power reception apparatus 10, is referred to as "constantly-useless magnetic flux".

Figure 5:
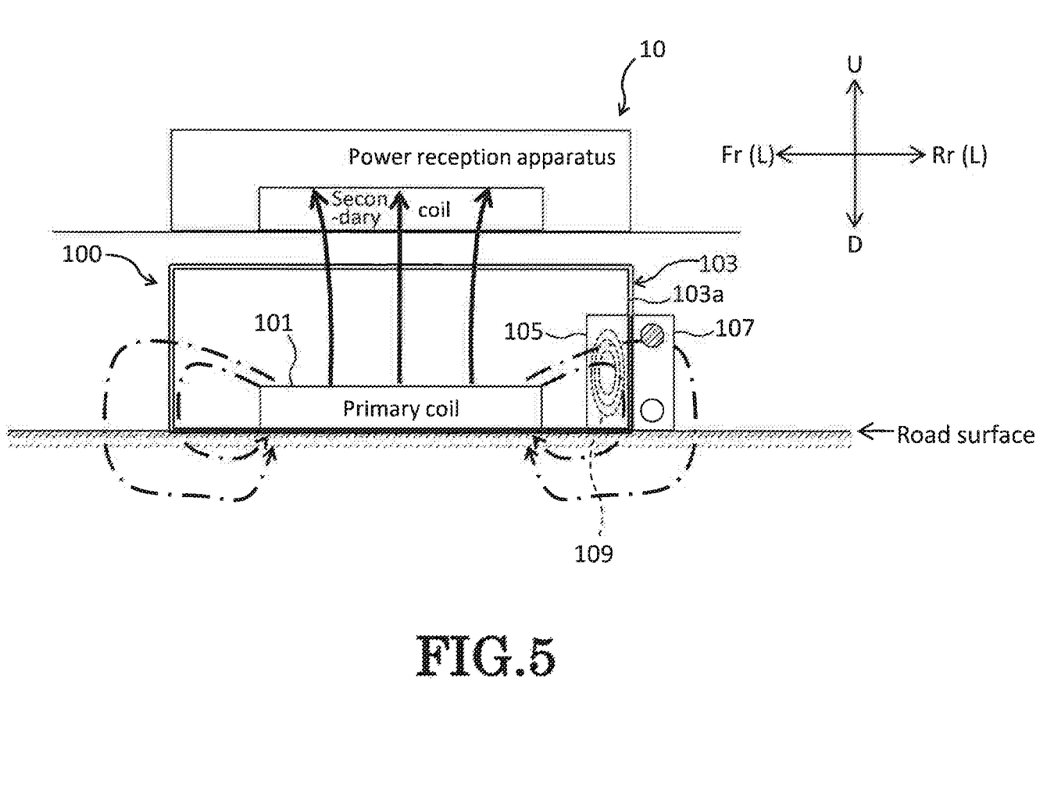
FIG. 5 is a schematic diagram illustrating a configuration of a power transmission apparatus according to a first embodiment.

FIG. 5 is a schematic diagram illustrating a configuration of the power transmission apparatus 100 according to the first embodiment. As illustrated in FIG. 5, the power transmission apparatus 100 according to the first embodiment includes a primary coil 101, a housing 103, a power receiving unit 105, and an indicator 107, is disposed on a road surface constituting a parking facility, and is connected to an outer power system such as a commercial power source.

The primary coil 101 is provided in an inner space of the housing 103 so that a winding surface thereof is parallel to an installation surface of the power transmission apparatus 100. When an alternating current flows through the primary coil 101 by AC power obtained from the external power system, a magnetic field is generated, and the primary coil 101 transmits power to the power reception apparatus 10 in a non-contact manner. The housing 103 accommodates the primary coil 101 and the power receiving unit 105.

The power receiving unit 105 is disposed on a sidewall 103a of the housing 103 extending in a vertical direction, and receives power from the primary coil 101 in a non-contact manner only by the constantly-useless magnetic flux indicated by arrows alternate long and short dash lines in FIG. 5. The power receiving unit 105 includes a coil 109 therein, and is disposed inside the housing 103 such that a winding surface of the coil 109 is along the sidewall 103a. The indicator 107 is an electric load which operates with the power received by the power receiving unit 105, and indicates that a magnetic field is generated around the power transmission apparatus 100 by turning on the light when the current is carried.

Figure 6:
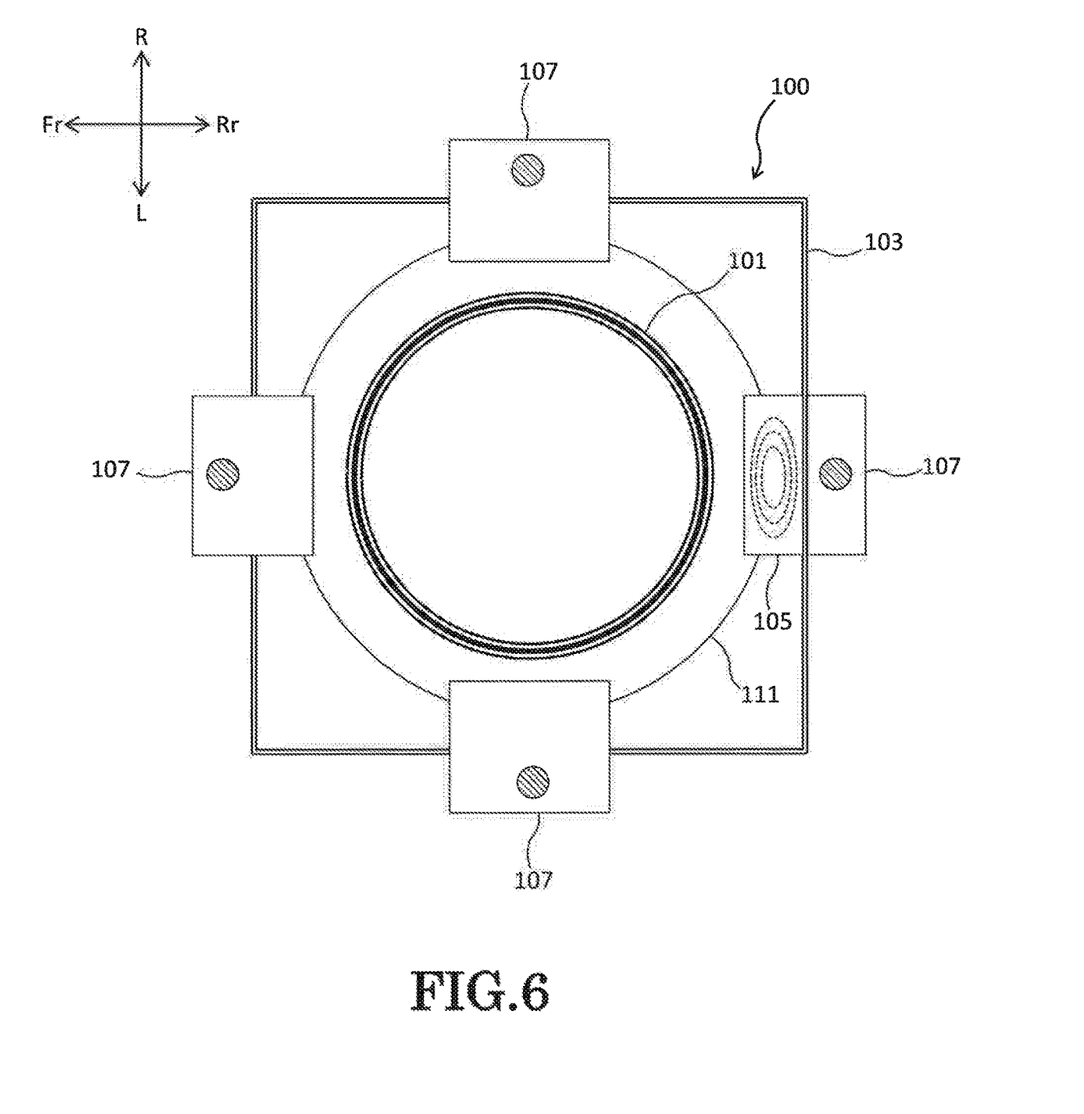
FIG. 6 is a schematic top view of the power transmission apparatus according to the first embodiment.

One indicator 107 is provided in the power transmission apparatus 100 in the example illustrated in FIG. 5, but a plurality of indicators 107 may be provided separately from each other as illustrated in FIG. 6. In this case, the power received by the power receiving unit 105 is supplied to the plurality of indicators 107 through a power distribution line 111.

Figure 7:
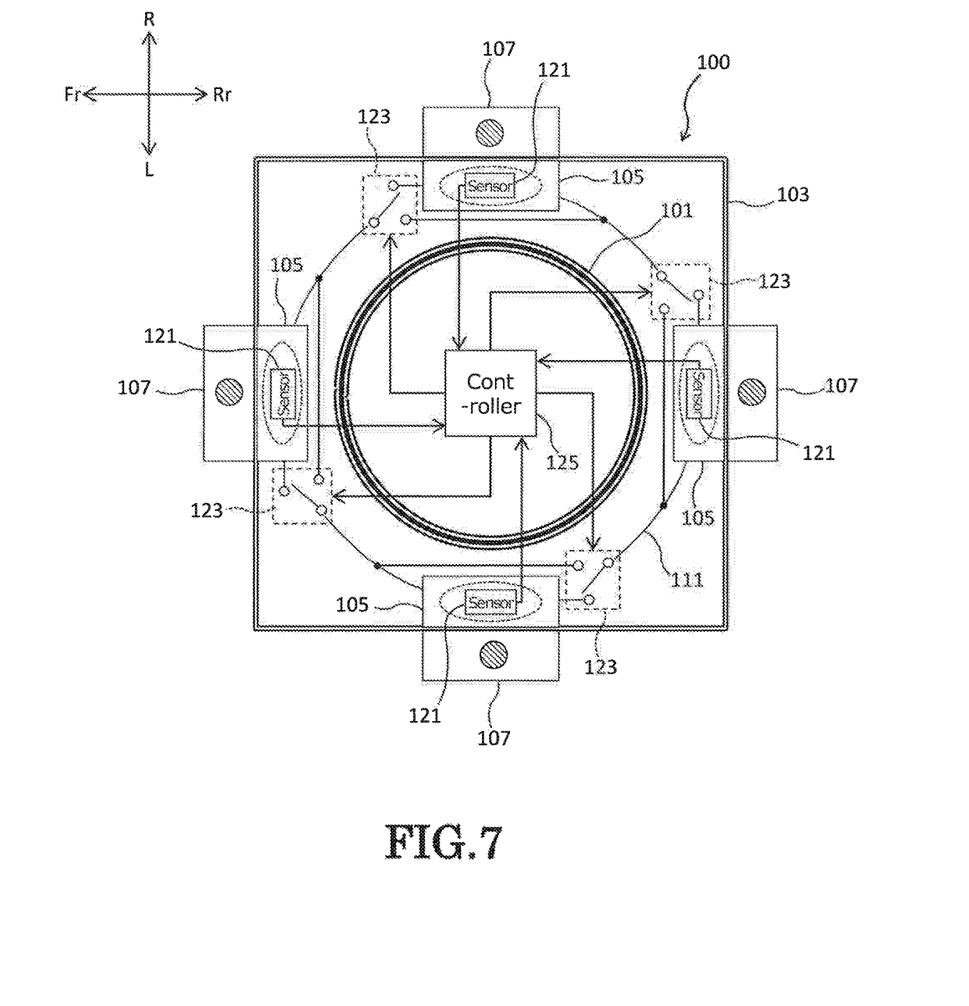
FIG. 7 is a schematic top view of the power transmission apparatus according to the first embodiment.

In addition, one power receiving unit 105 is provided in the power transmission apparatus 100 in the example illustrated in FIG. 5, but a plurality of power receiving units 105 may be provided separately from each other as illustrated in FIG. 7, When the power transmission apparatus 100 includes the plurality of power receiving units 105, the power transmission apparatus 100 is provided with a sensor 121 that detects the amount of power received by the respective power receiving units 105, a switch 123 that switches opening and closing of circuits of the respective power receiving units 105, and a controller 125 that controls opening and closing of the switch 123. The controller 125 controls the opening and closing of the switch 123 according to the received power amount detected by the sensor 121, For example, the controller 125 opens the switch for opening and closing the circuit of the power receiving unit having the smallest received power amount among the plurality of power receiving units 105. When the circuit of the power receiving unit is opened, no induced electromotive force is generated even if the magnetic flux interlinks with the secondary coil of the power receiving unit. When the number of the power receiving units 105 is three or more, the controller 125 may close only the switch for opening and closing the circuit of the power receiving unit having the largest received power amount.

As described above, according to the embodiment, the power receiving unit 105 is disposed on the sidewall 103a of the housing 103 for accommodating the primary coil 101, and the power receiving unit 105 receives the power from the primary coil 101 only by the constantly-useless magnetic flux. Therefore, the indicator 107, which operates with the power received by the power receiving unit 105, for example, can display the fact that the non-contact power supply is in progress, without affecting the original non-contact power supply from the power transmission apparatus 100 to the power reception apparatus 10.

In addition, since the housing 103 accommodates not only the primary coil 101 but also the power receiving unit 105, the power receiving unit 105 can also be protected by the housing 103.

Since the power receiving unit 105 is disposed on the sidewall 103a of the housing 103, the winding surface of the coil 109 is in the state standing in the vertical direction. Therefore, it is possible to prevent metal foreign matters or the like from adhering to the coil 109 of the power receiving unit 105.

In the case where the plurality of power receiving units 105 are disposed, the plurality of power receiving units 105 are disposed separately from each other, and thus the indicator 107 operates with the power received by at least one power receiving unit 105 even if the leakage magnetic flux changing depending on the relative position of the power transmission apparatus 100 and the power reception apparatus 10 is in any state.

Furthermore, since the power distribution line 111 is provided, the plurality of indicators 107 can operate with the power received by at least one of the plurality of power receiving units 105.

Since the power receiving unit 105 having the smallest received power amount may receive the useful magnetic flux from the power transmission apparatus 100 to the power reception apparatus 10, it is possible to suppress the reduction in efficiency of the original non-contact power supply from the power transmission apparatus 100 to the power reception apparatus 10 by opening the switch 123 of the power receiving unit 105 to be unused.

Further, since the power receiving unit 105 having the largest received power amount has a high possibility of receiving the power only by the useless magnetic flux, it is possible to suppress the reduction in efficiency of the original non-contact power supply due to receiving the useful magnetic flux by another power receiving unit 105, by closing only the switch 123 of the power receiving unit 105 to be used.

In addition, since the power receiving unit 105 having the small received power amount may receive the useful magnetic flux from the power transmission apparatus 100 to the power reception apparatus 10 and the power receiving unit 105 having the large received power amount has a high possibility of receiving the power only by the leakage magnetic flux, it is possible to suppress the reduction in efficiency of the original non-contact power supply from the power transmission apparatus 100 to the power reception apparatus 10 by selecting the power reception or non-reception in the plurality of power receiving units 105 based on the received power amount.

Second Embodiment

Figure 8:
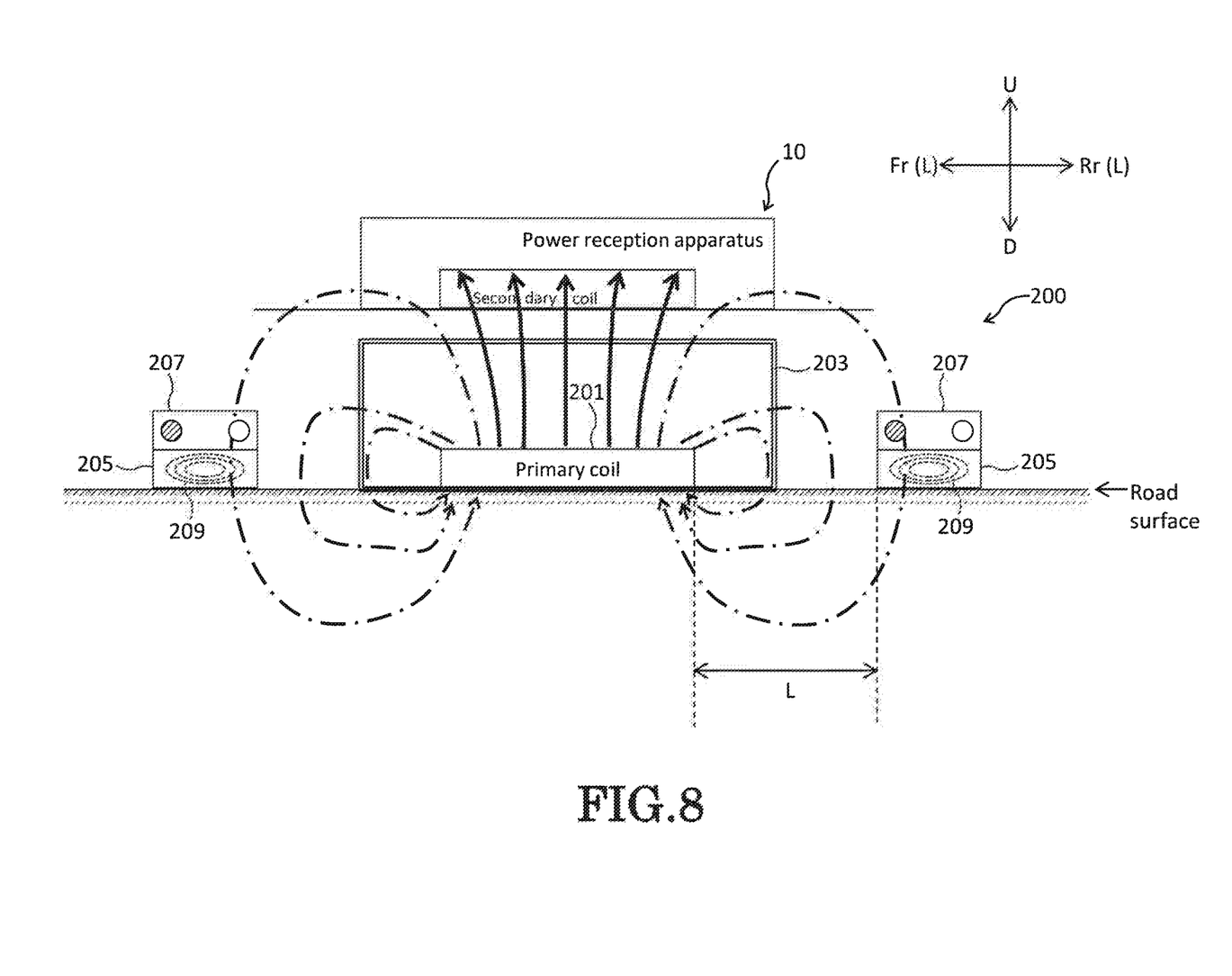
FIG. 8 is a schematic diagram illustrating a configuration of a power transmission apparatus according to a second embodiment.

FIG. 8 is a schematic diagram illustrating a configuration of a power transmission apparatus 200 according to a second embodiment. A power reception apparatus 10 mounted on an electric vehicle 11 has the same configuration as in the first embodiment.

As illustrated in FIG. 8, the power transmission apparatus 200 according to the second embodiment includes a primary coil 201, a housing 203, a power receiving unit 205, and an indicator 207, is disposed on a road surface constituting a parking facility, and is connected to an outer power system such as a commercial power source.

The primary coil 201 is provided in an installation surface of an inner space of the housing 203 so that a winding surface, thereof is parallel to the installation surface of the power transmission apparatus 200. When an alternating current flows through the primary coil 201 by AC power obtained from the external power system, a magnetic field is generated, and the primary coil 201 transmits power to the power reception apparatus 10 in a non-contact manner. The housing 203 accommodates the primary coil 201.

At least one power receiving unit 205 is disposed at a position apart from a side end of the primary coil 201 by a predetermined distance L, and receives power from the primary coil 201 in a non-contact manner by useless magnetic flux indicated by arrows of an alternate long and short lines in FIG. 8. The power receiving unit 205 includes a coil 209 therein, and is disposed on an installation surface such that a winding surface of the coil 209 is along the installation surface of the primary coil 201. The predetermined distance L by which the power receiving unit 205 is disposed apart from the side end of the primary coil 201 is a distance that the power reception apparatus 10 is located at a position where power transmission efficiency between the power transmission apparatus 200 and the power reception apparatus 10 is maximized and the power receiving unit 205 receives minimum power at which the indicator 207 can operate when the power transmission apparatus 200 transmits predetermined power to the power reception apparatus 10. The power receiving unit 205 may be disposed at a position within the predetermined distance L from the side end of the primary coil 201.

Figure 9:
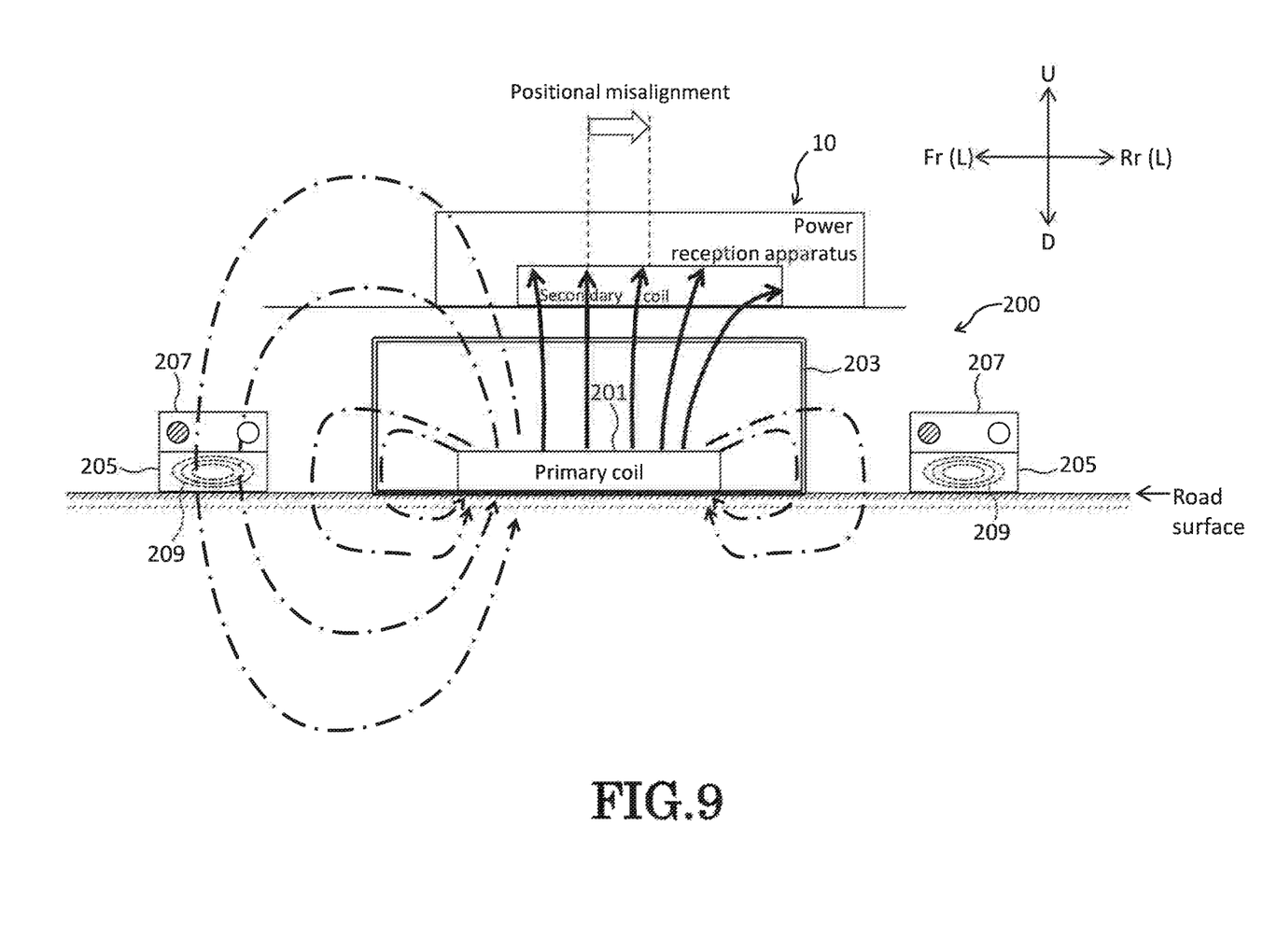
FIG. 9 is a schematic diagram illustrating a configuration of the power transmission apparatus according to the second embodiment in a state where there is positional misalignment.
Figure 10:
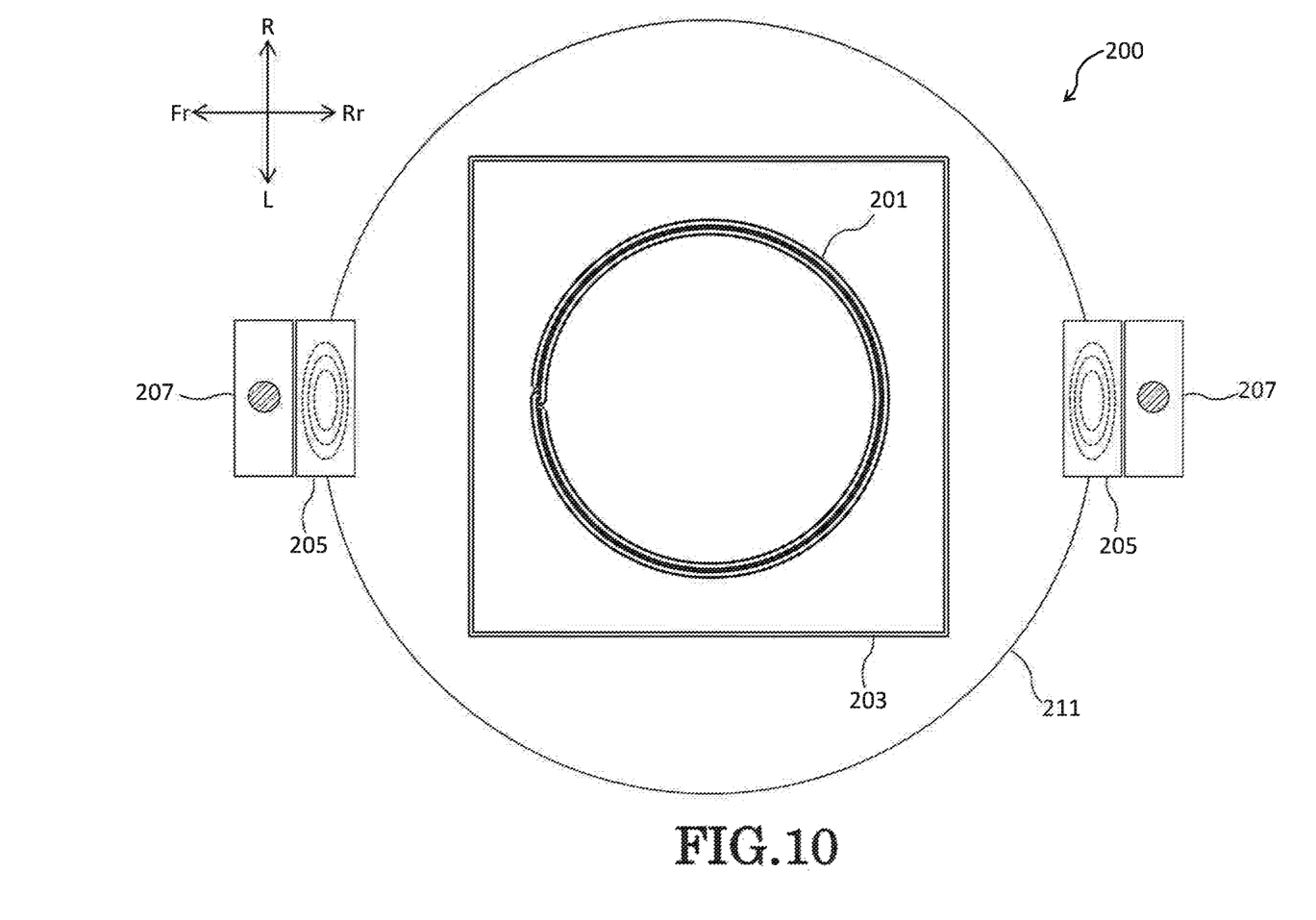
FIG. 10 is a schematic top view of the power transmission apparatus according to the second embodiment.

FIG. 8 illustrates a state in which the power reception apparatus 10 is located at the position where the power transmission efficiency between the power transmission apparatus 200 and the power reception apparatus 10 is maximized. Although two power receiving units 205 are disposed separately from each other, both of them are disposed at the positions apart from the side end of the primary coil 201 by the predetermined distance L in the state illustrated in FIG. 8, thereby being capable of receiving the power from the primary coil 201 due to the useless magnetic flux. In the embodiment, as illustrated in FIG. 9, in a state where a position of the power reception apparatus 10 is misaligned with the power transmission apparatus 200, the power receiving unit 205 provided in the positional misalignment direction can hardly receive the power from the primary coil 201 due to the useless magnetic flux, but the power receiving unit 205 provided in a direction opposite to the positional misalignment direction can sufficiently receive the power from the primary coil 201 due to the useless magnetic flux. As illustrated in FIG. 10, these two power receiving units 205 are connected to each other by a power distribution line 211, and power received from the primary coil 201 by at least one of the power receiving units 205 is supplied to the indicator 207 through the power distribution line 211.

The indicator 207 is an electric load which operates with the power received by the power receiving unit 205, and displays that a magnetic field is generated around the power transmission apparatus 200 by turning on the light when the current is carried. Similarly to the power receiving unit 205, the indicator 207 is disposed apart from the side end of the primary coil 201 by a predetermined distance L.

Figure 11:
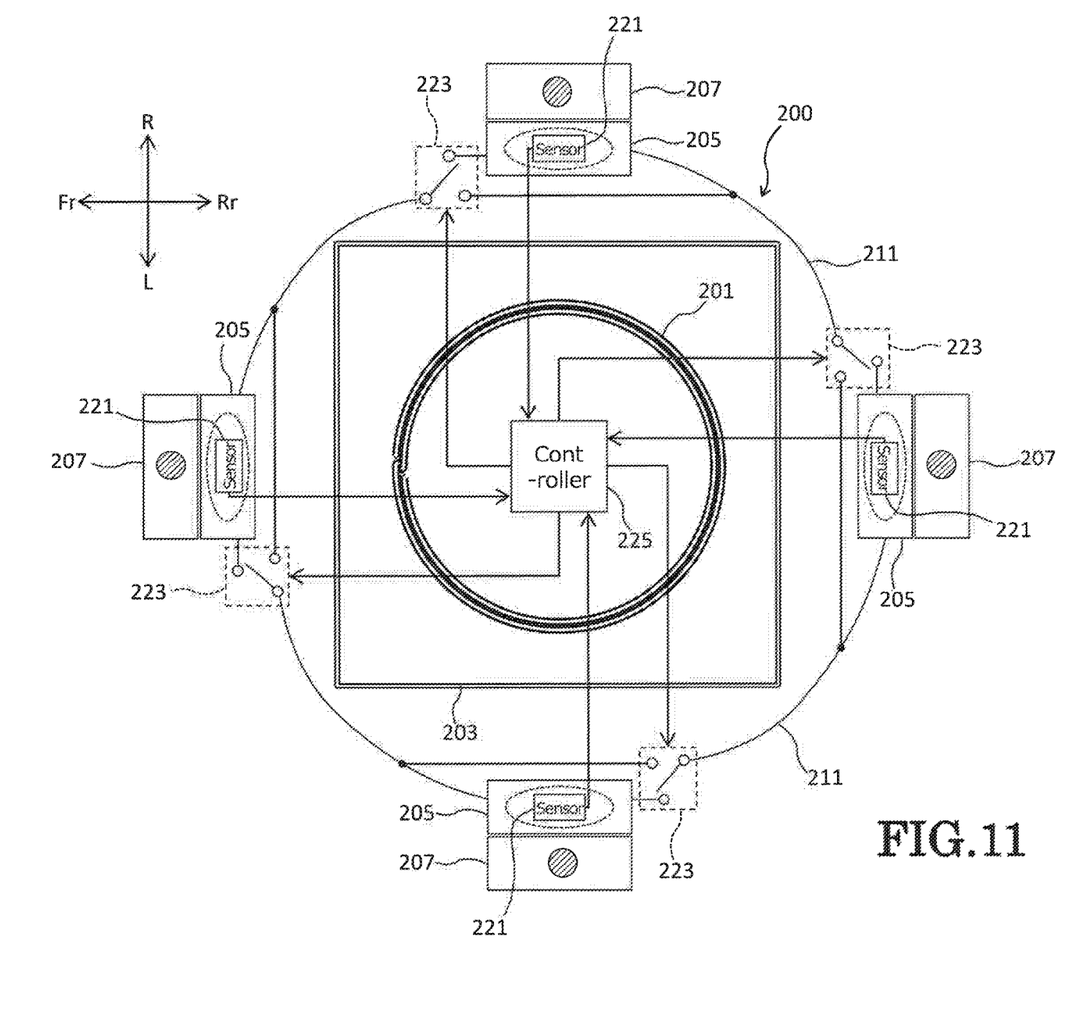
FIG. 11 is a schematic top view of the power transmission apparatus according to the second embodiment.

Two power receiving units 205 are provided in the power transmission apparatus 200 in the examples illustrated in FIGS. 8 to 10, but three or more power receiving units 205 may be provided separately from each other. As illustrated in FIG. 11, when the power transmission apparatus 200 includes three or more power receiving units 205, the power transmission apparatus 200 is provided with a sensor 221 that detects the amount of power received by the respective power receiving units 205, a switch 223 that switches opening and closing of circuits of the respective power receiving units 205, and a controller 225 that controls opening and closing of the switch 223. The controller 225 controls the opening and closing of the switch 223 according to the received power amount detected by the sensor 221. For example, the controller 225 opens the switch for opening and closing the circuit of the power receiving unit having the smallest received power amount among the plurality of power receiving units 205. When the circuit of the power receiving unit is opened, no induced electromotive force is generated even if the magnetic flux interlinks with the secondary coil of the power receiving unit. When the number of the power receiving units 205 is three or more, the controller 225 may close only the switch for opening and closing the circuit of the power receiving unit having the largest received power amount.

As described above, according to the embodiment, the power receiving unit 205 is disposed on the same plane on which the primary coil 201 is disposed, and the power receiving unit 205 receives the power from the primary coil 201 only by the useless magnetic flux. Therefore, the indicator 207, which operates with the power received by the power receiving unit 205, for example, can display the fact that the non-contact power supply is in progress, without affecting the original non-contact power supply from the power transmission apparatus 200 to the power reception apparatus 10.

In addition, the power receiving unit 205 receives minimum power at which the indicator 207 can operate due to the useless magnetic flux when there is no positional misalignment of the power reception apparatus 10 with respect to the power transmission apparatus 200, and the power receiving unit 205 receives the power with which the indicator 207 can sufficiently operate by the useless magnetic flux without using the useful magnetic flux when there is the positional misalignment. Therefore, the power receiving unit 205 can receive the power only by the leakage magnetic flux without using the useful magnetic flux as much as possible.

Further, since the direction of the useless magnetic flux at the power receiving unit 205 apart from the side end of the primary coil 201 by the predetermined distance L is substantially a vertical direction as illustrated in FIG. 8, the winding surface of the coil 209 of the power receiving unit 205 is disposed along the installation surface of the primary coil 201, and thus the power receiving unit 205 can receive the power with the useless magnetic flux having good efficiency.

In the case where the plurality of power receiving units 205 are disposed, the plurality of power receiving units 205 are disposed separately from each other, and thus the indicator 207 operates with the power received by at least one power receiving unit 205 even if the leakage magnetic flux changing depending on the relative position of the power transmission apparatus 200 and the power reception apparatus 10 is in any state.

Furthermore, since the power distribution line 211 is provided, the plurality of indicators 207 can operate with the power received by at least one of the plurality of power receiving units 205.

Since the power receiving unit 205 having the smallest received power amount may receive the useful magnetic flux from the power transmission apparatus 200 to the power reception apparatus 10, it is possible to suppress the reduction in efficiency of the original non-contact power supply from the power transmission apparatus 200 to the power reception apparatus 10 by opening the switch 223 of the power receiving unit 205 to be unused.

Further, since the power receiving unit 205 having the largest received power amount has a high possibility of receiving the power only by the useless magnetic flux, it is possible to suppress the reduction in efficiency of the original non-contact power supply due to receiving the useful magnetic flux by another power receiving unit 205, by closing only the switch 223 of the power receiving unit 205 to be used.

In addition, since the power receiving unit 205 having the small received power amount may receive the useful magnetic flux from the power transmission apparatus 200 to the power reception apparatus 10 and the power receiving unit 205 having the large received power amount has a high possibility of receiving the power only by the leakage magnetic flux, it is possible to suppress the reduction in efficiency of the original non-contact power supply from the power transmission apparatus 200 to the power reception apparatus 10 by selecting the power reception or non-reception in the plurality of power receiving units 205 based on the received power amount.

The present invention is not limited to the above-described embodiments, and modification, improvement, etc. are appropriately possible.

DESCRIPTION OF REFERENCE NUMERALS AND CHARACTERS

10 Power reception apparatus
11 Electric vehicle
100, 200 Power transmission apparatus
101, 201 Primary coil
103, 203 Housing
103a Sidewall
105, 205 Power receiving unit
107, 207 Indicator
109, 209 Coil
111, 211 Power distribution line
121, 221 Sensor
123, 223 Switch
125, 225 Controller

The invention claimed is:

1. A power transmission apparatus, comprising:
a power transmitting circuit which transmits power to a first power receiving circuit in a non-contact manner;
a housing which accommodates the power transmitting circuit;
a plurality of second power receiving circuits which is disposed on a sidewall of the housing and receives power from the power transmitting circuit in a non-contact manner;
an electric load which operates with power that the plurality of second power receiving circuits has received;
a switch which is provided in each of the plurality of second power receiving circuits to open and close a circuit of a respective second power receiving circuit of the plurality of second power receiving circuits;
a sensor which detects a received power amount in each of the plurality of second power receiving circuits; and
a controller which controls opening and closing of the switch,
wherein the controller opens the switch of the second power receiving circuit having a smallest received power amount, and
wherein the second power receiving circuits of the plurality of second power receiving circuits are disposed separately from each other.

2. The power transmission apparatus according to claim 1, wherein the plurality of second power receiving circuits is disposed inside the housing.

3. The power transmission apparatus according to claim 1, wherein the sidewall extends in a vertical direction, and the plurality of second power receiving circuits is disposed such that a winding surface of a coil included in each second power receiving circuit is along the sidewall.

4. The power transmission apparatus according to claim 1, wherein a plurality of electric loads are provided,
the plurality of electric loads are disposed separately from each other, and the power transmission apparatus includes a power distribution line through which power received by at least one of the plurality of second power receiving circuits is supplied to the plurality of electric loads.

5. The power transmission apparatus according to claim 1, wherein the controller closes only the switch of the second power receiving circuit having a largest received power amount.

6. The power transmission apparatus according to claim 1, further comprising:
a controller which allows the plurality of second power receiving circuits to select power reception or non-reception in a non-contact manner from the power transmitting circuit, based on the received power amount in each of the plurality of second power receiving circuits.

7. A power transmission apparatus, comprising:
a power transmitting circuit which is disposed on a plane and transmits power to a first power receiving circuit in a non-contact manner;
a second power receiving circuit which is disposed on the plane and receives power from the power transmitting circuit in a non-contact manner; and
an electric load which operates with power that the second power receiving circuit has received,
wherein the second power receiving circuit is disposed within a predetermined distance from the power transmitting circuit, and
the predetermined distance is a distance that the first power receiving circuit is located at a position where power transmission efficiency between the power transmission circuit and the first power receiving circuit is maximized, and the second power receiving circuit receives minimum power with which the electric load enables to operate when the power transmission circuit transmits predetermined power to the first power receiving circuit.

8. The power transmission apparatus according to claim 7, wherein the second power receiving circuit is disposed at a position apart from the power transmitting circuit by the predetermined distance.

9. The power transmission apparatus according to claim 8, wherein the second power receiving circuit is disposed such that a winding surface of a coil included in the second power receiving circuit is along the plane.

10. A power transmission apparatus, comprising:
a power transmitting circuit which is disposed on a plane and transmits power to a first power receiving circuit in a non-contact manner;
a plurality of second power receiving circuits which is disposed on the plane and receives power from the power transmitting circuit in a non-contact manner;
an electric load which operates with power that the plurality of second power receiving circuits has received;
a switch which is provided in each of the plurality of second power receiving circuits to open and close a circuit of a respective second power receiving circuit of the plurality of second power receiving circuits;
a sensor which detects a received power amount in each of the plurality of second power receiving circuits; and
a controller which controls opening and closing of the switch,
wherein the controller opens the switch of the second power receiving circuit having a smallest received power amount, and
wherein the second power receiving circuits of the plurality of second power receiving circuits are disposed separately from each other.

11. The power transmission apparatus according to claim 10,
wherein a plurality of electric loads are provided,
the plurality of electric loads are disposed separately from each other, and
the power transmission apparatus includes a power distribution line through which power received by at least one of the plurality of second power receiving circuits is supplied to the plurality of electric loads.

12. The power transmission apparatus according to claim 10,
wherein the controller closes only the switch of the second power receiving circuit having a largest received power amount.

13. The power transmission apparatus according to claim 10, further comprising:
a controller which allows the plurality of second power receiving circuits to select power reception or non-reception in a non-contact manner from the power transmitting circuit, based on the received power amount in each of the plurality of second power receiving circuits.

* * * * *